United States Patent
Khatri et al.

(10) Patent No.: US 10,467,439 B2
(45) Date of Patent: Nov. 5, 2019

(54) DETECTING TAMPERING OF MEMORY CONTENTS IN AN INFORMATION HANDLING SYSTEM

(71) Applicant: DELL PRODUCTS, L.P., Round Rock, TX (US)

(72) Inventors: Mukund P. Khatri, Austin, TX (US); William C. Munger, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 184 days.

(21) Appl. No.: 15/642,317

(22) Filed: Jul. 5, 2017

(65) Prior Publication Data

US 2019/0012490 A1    Jan. 10, 2019

(51) Int. Cl.
| | | |
|---|---|---|
| G06F 21/00 | (2013.01) | |
| G06F 21/86 | (2013.01) | |
| G06F 12/14 | (2006.01) | |
| G06F 1/24 | (2006.01) | |
| G06F 21/57 | (2013.01) | |
| H04L 9/32 | (2006.01) | |
| H04L 9/06 | (2006.01) | |
| G06F 21/64 | (2013.01) | |
| G06F 21/79 | (2013.01) | |

(52) U.S. Cl.
CPC .............. *G06F 21/86* (2013.01); *G06F 1/24* (2013.01); *G06F 12/1408* (2013.01); *G06F 21/572* (2013.01); *G06F 21/575* (2013.01); *G06F 21/64* (2013.01); *G06F 21/79* (2013.01); *H04L 9/0643* (2013.01); *H04L 9/3236* (2013.01); *H04L 9/3239* (2013.01); G06F 2212/1052 (2013.01)

(58) Field of Classification Search
CPC ...... G06F 21/575; G06F 21/572; G06F 21/86; G06F 2212/1052; G06F 12/1408; G06F 1/24; H04L 9/0643; H04L 9/3239; H04L 9/3236
USPC .......................................................... 713/193
See application file for complete search history.

(56) References Cited

U.S. PATENT DOCUMENTS

| | | | | |
|---|---|---|---|---|
| 6,026,293 A | * | 2/2000 | Osborn ................. | G06F 21/565 380/247 |
| 7,424,606 B2 | * | 9/2008 | Lampson .............. | G06F 9/4406 713/156 |
| 8,732,824 B2 | * | 5/2014 | Arbaugh ................ | G06F 21/57 726/22 |

(Continued)

*Primary Examiner* — Syed A Zaidi
(74) *Attorney, Agent, or Firm* — Isidore PLLC (57) ABSTRACT

A method, an information handling system (IHS) and a detection system for detecting tampering of memory contents. The method includes retrieving, via a board management controller (BMC), from a first memory device, a first hash associated with current first data such as a firmware image stored on the first memory device and retrieving, from a second memory device, a previously stored second hash associated with initial first data. The method further includes determining if the first hash and the second hash match. In response to the first hash and the second hash not matching, an error message is generated which indicates that the current first data of the first memory device has been tampered with. The error message is stored to an error log. The error message identifies the specific current first data and/or firmware image that has been tampered with. The method repeats periodically during runtime.

20 Claims, 5 Drawing Sheets

(56) References Cited

U.S. PATENT DOCUMENTS

| | | | | |
|---|---|---|---|---|
| 9,135,444 B2* | 9/2015 | Carter | | G06F 21/57 |
| 2002/0052217 A1* | 5/2002 | Fukuzumi | | G06F 3/0607 |
| | | | | 455/556.1 |
| 2004/0073806 A1* | 4/2004 | Zimmer | | G06F 21/57 |
| | | | | 713/189 |
| 2004/0218440 A1* | 11/2004 | Kumar | | G11C 29/16 |
| | | | | 365/202 |
| 2004/0254006 A1* | 12/2004 | Lam | | G07F 17/32 |
| | | | | 463/16 |
| 2005/0204155 A1* | 9/2005 | Ravi | | G06F 21/575 |
| | | | | 726/22 |
| 2007/0005957 A1 | 1/2007 | Sahita et al. | | |
| 2007/0159643 A1 | 7/2007 | Bennetto et al. | | |
| 2007/0294205 A1 | 12/2007 | Xu et al. | | |
| 2007/0300207 A1* | 12/2007 | Booth | | G06F 21/575 |
| | | | | 717/126 |
| 2012/0079472 A1* | 3/2012 | Lenger | | G07F 17/32 |
| | | | | 717/170 |
| 2013/0159643 A1 | 6/2013 | Katagiri et al. | | |
| 2013/0174220 A1* | 7/2013 | Berg | | H04W 12/10 |
| | | | | 726/3 |
| 2013/0185564 A1* | 7/2013 | Jaber | | G06F 21/572 |
| | | | | 713/176 |
| 2014/0068238 A1* | 3/2014 | Jaber | | G06F 21/575 |
| | | | | 713/2 |
| 2014/0077928 A1* | 3/2014 | Markel | | G05B 1/00 |
| | | | | 340/5.8 |
| 2014/0208123 A1* | 7/2014 | Roth | | G06F 21/72 |
| | | | | 713/189 |
| 2014/0325196 A1* | 10/2014 | Munger | | G06F 9/4411 |
| | | | | 713/2 |
| 2015/0172054 A1* | 6/2015 | Prakash | | G06F 21/44 |
| | | | | 713/189 |
| 2015/0278524 A1* | 10/2015 | Liles | | G06F 21/572 |
| | | | | 726/22 |
| 2015/0288706 A1 | 10/2015 | Marshall | | |
| 2015/0324588 A1* | 11/2015 | Locke | | G06F 21/562 |
| | | | | 713/2 |
| 2016/0188879 A1* | 6/2016 | Sussman | | G06F 21/565 |
| | | | | 726/23 |
| 2016/0350536 A1* | 12/2016 | Grimes | | G06F 21/575 |

* cited by examiner

DETECTING TAMPERING OF MEMORY CONTENTS IN AN INFORMATION HANDLING SYSTEM

BACKGROUND

1. Technical Field

The present disclosure generally relates to information handling systems and in particular to the security of memory contents in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems can include various system components that have stored firmware. If the stored firmware of a system component is compromised during a computer attack or intrusion, the attack may not be detected until the next time the system is booted or re-booted. For servers, the next boot may not occur until planned downtime or after a power failure, which can be weeks or months later. Unfortunately, when the attack is detected during the next system boot, the information handling system may be prevented from booting and be placed out of service until the problem can be resolved.

BRIEF SUMMARY

Disclosed are a method, an information handling system (IHS), and a detection system for detecting tampering of memory contents in an IHS.

According to one embodiment, the method includes retrieving from a first memory device associated with a first system component, via a board management controller (BMC), a first hash associated with current first data such as a firmware (F/W) image stored on the first memory device and retrieving, from a second secure memory device, a previously stored second hash associated with initial first data. The method further includes determining if the first hash and the second hash match. In response to the first hash and the second hash not matching, the method includes generating an error message, which indicates that the current first data stored on the first memory device is not the same as the initial first data. The error message is stored to an error log. The error message identifies the specific current first data that has been tampered with. The method repeats periodically during runtime of the IHS.

According to another embodiment, the IHS includes a first IHS component having a first memory device and a board management controller (BMC) communicatively coupled to the first IHS component, the first memory device, and a second memory device. The BMC has firmware executing thereon for detecting tampering of memory contents. The firmware configures the BMC to retrieve from the first memory device, a first hash associated with current first data such as a F/W image of the first IHS component stored within the first memory device. The firmware further configures the BMC to retrieve from a second secure memory device, a previously stored second hash associated with initial first data. The firmware further configures the BMC to determine if the first hash and the second hash match. In response to the first hash and the second hash not matching, an error message is generated which indicates that the current first data is a modified version of the initial first data that has been tampered with or inserted into the first memory device in place of the initial first data. The error message is stored to an error log. The error message identifies the specific current first data that has been tampered with. The comparing of hashes repeats periodically during runtime of the IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a detection system for detecting tampering of contents associated with system components of an IHS.

The method includes (i) retrieving, via a board management controller (BMC), from a first memory device, a first hash associated with current first data, such as a firmware (F/W) image, associated with a component of an IHS and (ii) retrieving, from a second memory device, a previously stored second hash associated with initial first data. The method further includes determining if the first hash and the second hash match. In response to the first hash and the second hash not matching, the method includes generating an error message, which indicates that the current first data of the first memory device has been tampered with. The error message is stored to an error log. The error message identifies the specific current first data and/or firmware image that has been tampered with. The method repeats periodically during runtime of the IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
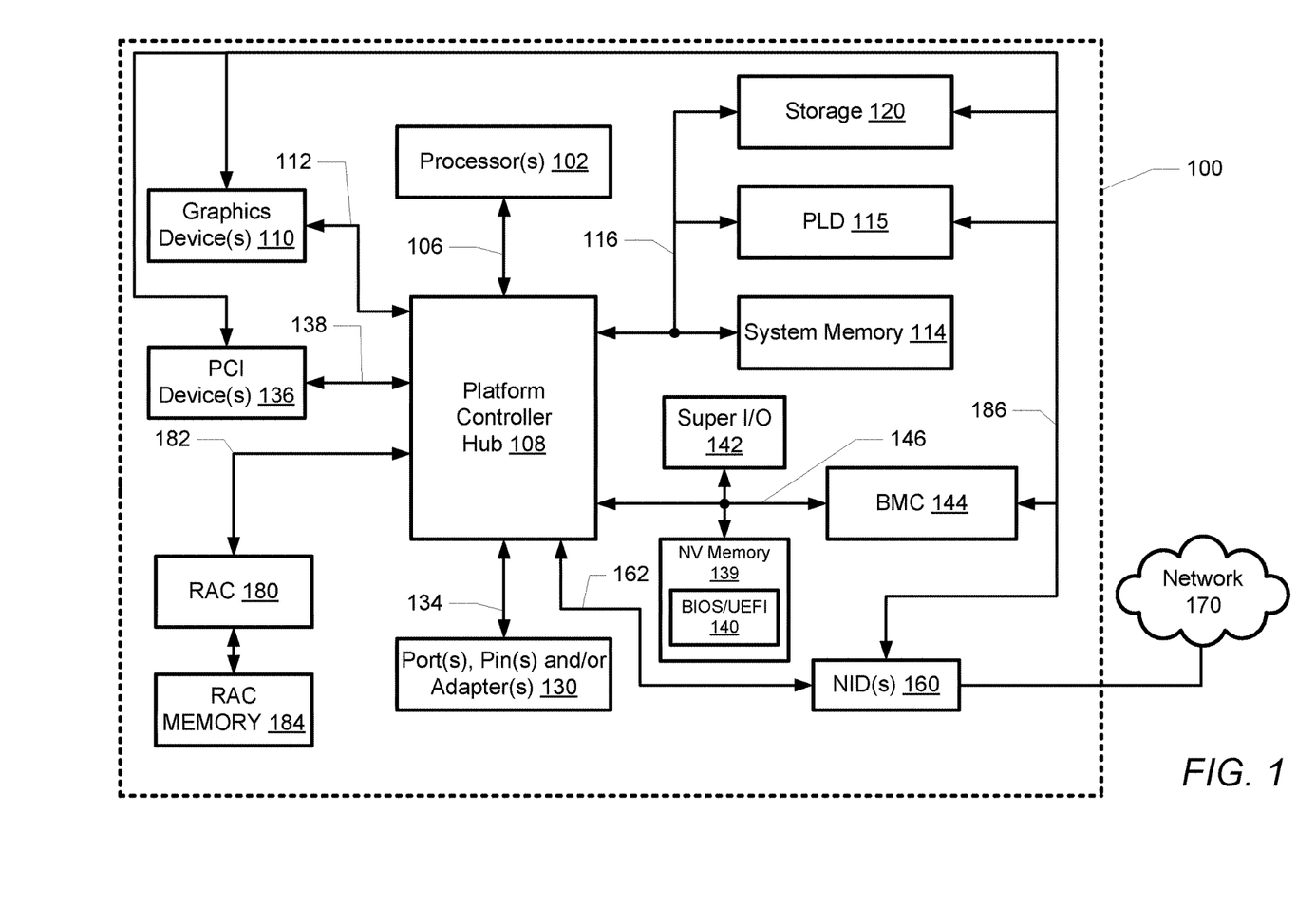
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to a chipset or platform controller hub (PCH) 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port (AGP) bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to programmable logic device (PLD) 115. PLD 115 is an electronic component that can be used to build configurable digital circuits. A PLD typically is configured for a particular application. In one embodiment, PLD 115 can be a complex PLD that has architectural features of both programmable array logic (PAL) and field programmable gate array (FPGA). PCH 108 is coupled by system bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over input/output (I/O) bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over I/O bus 134. For example, PCH 108 may be configured to allow data to be exchanged between IHS 100 and other devices, such as other IHSs attached to a network. In various embodiments, PCH 108 may support communication via wired or wireless data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in association with IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. In one embodiment, NV memory device 139 can be a secure memory device that protects the memory contents from tampering via the use of encryption. NV memory device 139 stores basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 is in communication with NV memory device 139, which can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally, or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse, and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 also includes a sideband bus 186 that communicatively couples BMC 144 to several IHS components including graphics devices 110, PLD 115, storage 120, PCI devices 136 and NID(s) 160. Sideband bus 186 can also communicatively couple BMC 144 to other components and devices within IHS 100. BMC 144 can use sideband bus 186 to send and receive data and images to IHS components connected to sideband bus 186. Sideband bus 186 can include any computer bus capable of communications between BMC 144 and other IHS components including graphics devices 110, PLD 115, storage 120, PCI devices 136 and NID(s) 160. In one embodiment, sideband bus 186 can utilize one of several bus protocols such as a low pin count (LPC) bus, an inter-integrated circuit (I2C) bus, and a serial general purpose input/output (SGPIO) bus. An LPC bus is a computer bus that is used to connect low-bandwidth devices. An I2C bus is a multi-master, multi-slave, packet switched, single-ended, serial computer bus. A SGPIO bus is a four-signal (or four-wire) computer bus.

In another embodiment, LPC bus 146 and/or sideband bus 186 can be a peripheral component interconnect express (PCIe) bus that utilizes a management component transport protocol (MCTP). MCTP is a bus protocol that supports communications between different intelligent hardware components that make up a platform management subsystem. MCTP further provides monitoring and control functions. The MCTP protocol is independent of the underlying physical bus properties, as well as the data link layer messaging used on the bus. The MCTP communication model includes a message format, transport description, message exchange patterns, and operational endpoint characteristics. PCIe MCTP allows BMC 144 to communicate with various components or devices of IHS 100 such as graphics devices 110, PLD 115, storage 120, PCI devices 136, and NID(s) 160.

IHS 100 further includes a remote access controller (RAC) 180 coupled via PCI bus 182 to PCH 108. RAC 180 provides management functions that allow an administrator to deploy, monitor, manage, configure, update, troubleshoot, and remediate IHS 100. RAC 180 is also coupled to RAC memory 184. In one embodiment, RAC memory 184 can be shared with processor(s) 102.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

In an embodiment, a motherboard (not specifically shown) is provided that is configured to provide structural support, power, and electrical connectivity between the various aforementioned components. Such a motherboard may include multiple connector sockets in various configurations, adapted to receive pluggable circuit cards, component chip packages, etc.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2A:
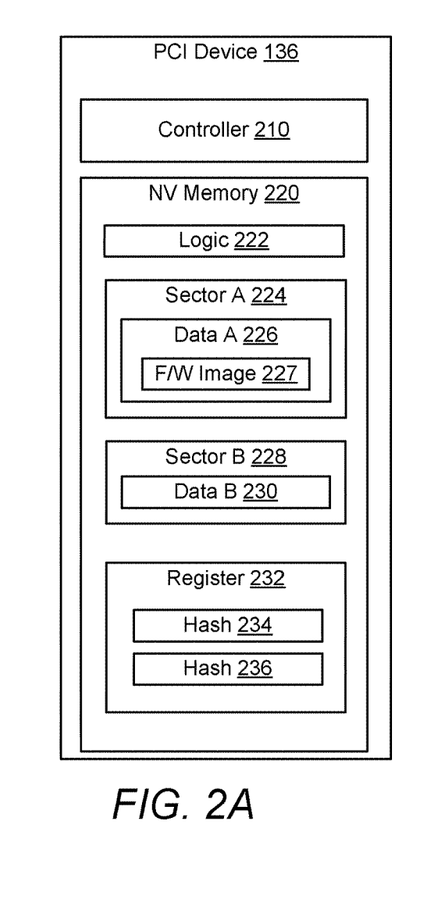
FIG. 2A illustrates example components within an example storage device, in accordance with one embodiment.

In the description of each of the following figures, reference is also made to specific components illustrated within the preceding figures. With reference now to FIG. 2A, one embodiment of PCI device 136 of IHS 100 is shown. PCI device 136 includes PCI controller 210 and non-volatile (NV) memory device 220. PCI controller 210 can manage and control the operation of PCI device 136. As illustrated, NV memory device 220 can contain logic 222, several sectors, including sector A 224 and sector B 228, and one or more registers 232. For simplicity, only a single register 232 is presented. Logic 222 can be hardware logic that implements one or more operations or functions. Sectors 224 and 228 are partitions, regions or blocks of memory within NV memory device 220. Sector A 224, includes data A 226 and sector B 228 includes data B 230. In one embodiment, data A 226 can include device boot code or F/W image 227 that is used during booting of IHS 100 to initialize PCI device 136. During a computer attack or a firmware update, the memory contents of portions of NV memory 220, (e.g. boot code or F/W image 227) can be subject to unwanted modification or tampering. Logic 222 and register 232 are read-only devices when accessed via bus 138. The contents of logic 222 and register 232 cannot be modified via a computer attack or malicious code. Data A 226 and data B 230 are data within components (e.g. PCI device 136) of IHS 100 that allow the OS to communicate with the components and are stored during manufacturing and should only be modified if the images are being updated. In other words, if this data changes during normal operation, it probably indicates a computer attack.

Register 232 contains hashes 234 and 236. Hash 234 is the hash value of the contents of sector A 224 (e.g. data A 226) and hash 236 is the hash value of the contents of both sector A 224 and sector B 228 (e.g. data A 226 and data B 230). Hashes 234 and 236 are unique values generated by a hash function of the data contained in one or more memory sectors. In one embodiment, generating a hash of both sectors 224 and 228 together can result in the consumption of fewer processing resources. In another embodiment, generating a hash of each of the sectors 224 and 228 can provide more detailed results as to the specific sector of any detected tampering within a specific sector. In one embodiment, if a generated hash for a specific sector does not match a previously stored initial hash for that specific sector, the data in that specific sector may have been tampered with. If a single hash is generated for each sector, the tampered sector can be more readily identified than when a single hash is generated for ten sectors. Hashes 234 and 236 are unique values generated by a hash function of the data contained in one or more memory sectors. Hashes can be used to uniquely identify information. In one embodiment, the hash function can be a secure hash function such as the secure hash algorithm 1 (SHA-1) hash function. According to one aspect of the disclosure, when changes to the contents of NV memory device 220 are detected, logic 222 generates a hash of data A 226 and a hash of both data A 226 and data B 230 during operation. Logic 222 stores the generated hashes to register 232 for use in a later comparison to initial hashes stored during a provisioning process of the IHS. The hash values are recalculated when the contents (i.e. data and/or images) of NV memory device 220 are changed or modified.

Figure 2B:
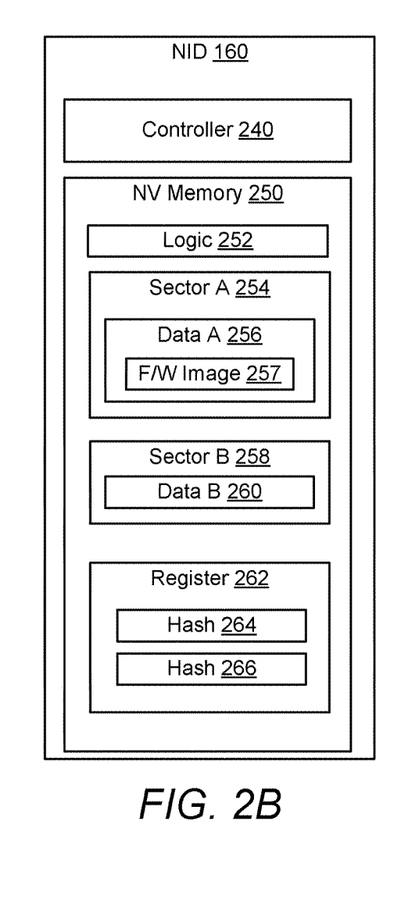
FIG. 2B illustrates example components within an example network interface device, in accordance with one embodiment.

FIG. 2B illustrates one embodiment of NID 160. NID 160 includes NID controller 240 and NV memory device 250. NID controller 240 can manage and control the operation of NID 160. As illustrated, NV memory device 250 can contain logic 252, several sectors including sector A 254 and sector B 258, and one or more register, of which a single one, register 262, is shown. Logic 252 can be hardware logic that implements one or more operations or functions. Sectors 254 and 258 are partitions, regions, or blocks of memory within NV memory device 250. Sector A 254 includes data A 256 and sector B 258 includes data B 260. In one embodiment, data A 256 can include device boot code or F/W image 257 that is used during booting of IHS 100 to initialize NID 160. During a computer attack or a firmware update, the memory contents of portions of NV memory 250, (e.g. boot code or F/W image 257) can be subject of unwanted modification or tampering. Logic 252 and register 262 are read-only devices when accessed via bus 162 or 186.

The contents of logic 252 and register 262 cannot be modified via a computer attack or malicious code.

Register 262 contains hashes 264 and 266. Hash 264 is the hash value of the contents of sector A 254 (e.g. data A 256) and hash 266 is the hash value of the contents of both sector A 254 and sector B 258 (e.g. data A 256 and data B 260). Hashes 264 and 266 are unique values generated by a hash function of the data contained in one or more memory sectors. Hashes can be used to uniquely identify information. In one embodiment, the hash function can be a secure hash function such as the SHA-1 hash function. According to one aspect of the disclosure, during operation of IHS, logic 252 periodically generates a hash of data A 256 and a hash of both data A 256 and data B 260, and logic 252 stores the generated hashes to register 262 for use in a later comparison to initial hashes stored during a provisioning process of the IHS.

Figure 2C:
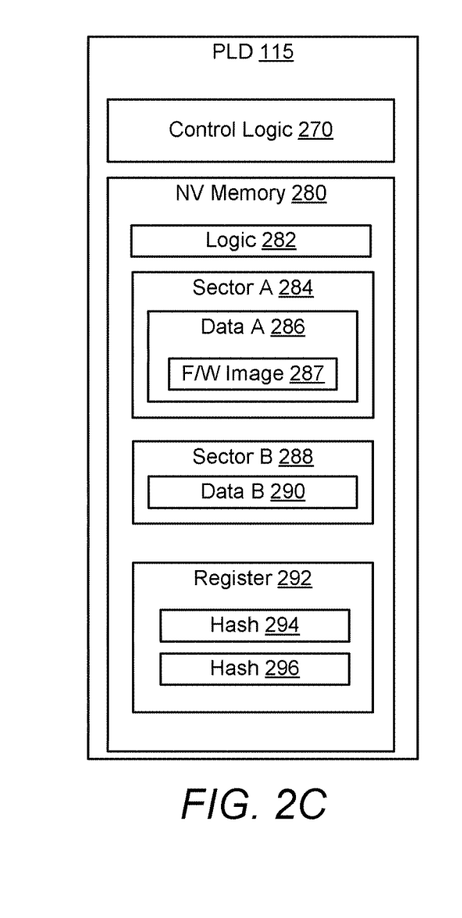
FIG. 2C illustrates example components within an example programmable logic device, in accordance with one embodiment.

FIG. 2C illustrates one embodiment of PLD 115. PLD 115 includes control logic 270 and NV memory device 280. Control logic 270 can manage and control the operation of PLD 115. As illustrated, NV memory device 280 can contain logic 282, several sectors, including sector A 284 and sector B 288, and one or more registers 292. Logic 282 can be hardware logic that implements one or more operations or functions. Sectors 284 and 288 are partitions, regions, or blocks of memory within NV memory device 280. Sector A 284 includes data A 286 and sector B 288 includes data B 290. In one embodiment, data A 286 can include device boot code or F/W image 287 that is used during booting of IHS 100 to initialize PLD 115. During a computer attack or a firmware update, the memory contents of portions of NV memory device 280, (e.g. boot code or F/W image 287) can be subject to unwanted modification or tampering. Logic 282 and register 292 are read-only devices when accessed via bus 116 or 186. The contents of logic 282 and register 292 cannot be modified via a computer attack or malicious code.

Register 292 contains hashes 294 and 296. Hash 294 is the hash value of the contents of sector A 284 (e.g. data A 286) and hash 296 is the hash value of the contents of both sector A 284 and sector B 288 (e.g. data A 286 and data B 290). Hashes 294 and 296 are unique values generated by a hash function of the data contained in one or more memory sectors. Hashes can be used to uniquely identify information. In one embodiment, the hash function can be a secure hash function such as the SHA-1 hash function. According to one aspect of the disclosure, logic 282 periodically generates a hash of data A 286 and a hash of both data A 286 and data B 290 during operation and logic 282 stores the generated hashes to register 292 for use in a later comparison to initial hashes stored during a provisioning process of the IHS.

Figure 3A:
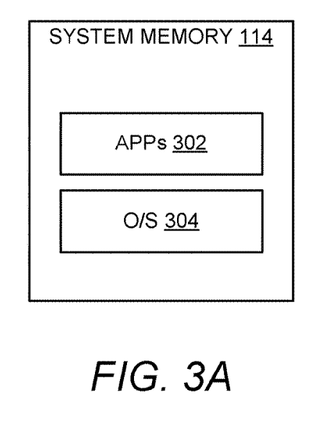
FIG. 3A illustrates example contents of a system memory in an IHS, in accordance with one embodiment.

With reference now to FIG. 3A, one embodiment of example contents of system memory 114 of IHS 100 is shown. System memory 114 includes data, software, and/or firmware modules, including application(s) 302 and operating system (O/S) 304. System memory 114 can also include other data, software, and/or firmware modules.

Figure 3B:
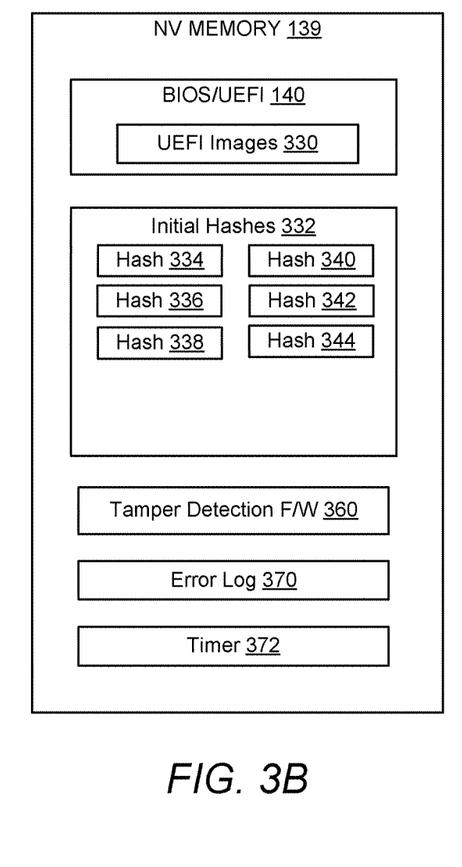
FIG. 3B illustrates example contents of a non-volatile storage device, in accordance with one embodiment.

Turning to FIG. 3B, one embodiment of example contents of NV memory device 139 of IHS 100 is shown. NV memory device 139 includes BIOS/UEFI 140, initial hashes 332, tamper detection F/W 360, error log 370 and timer 372. BIOS/UEFI 140 can include UEFI images 330 that can be loaded during system start-up or booting by IHS 100. Initial hashes 332 are the hashes retrieved from registers 232, 262 and 292 during a provisioning process of IHS 100. According to one aspect of the disclosure, initial hashes 332 are received and stored to NV memory device 139 during the provisioning process and are used for a later comparison during operation of IHS 100. Initial hashes 332 include hash 334 (corresponding to hash 234), hash 336 (corresponding to hash 236), hash 338 (corresponding to hash 264), hash 340 (corresponding to hash 264), hash 342 (corresponding to hash 294) and hash 344 (corresponding to hash 296).

Tamper detection F/W 360 executes on BMC 144 to facilitate the detection of tampered memory contents. Tamper detection F/W 360 performs the processes presented in the flowcharts of FIGS. 4, 5 and 6. Error log 370 contains error messages generated by BMC 144 when tampering of memory contents are detected during the operation of IHS 100. Timer 372 can have a pre-determined expiration time value. Timer 372 is used to periodically trigger the comparison of current hashes to initial hashes during runtime to detect the tampering of F/W images and data.

In one embodiment, during an initial provisioning process, such as during manufacturing of IHS, BMC 144 receives an initial hash (e.g., hash 294) and stores the initial hash to NV memory device 139 as hash 342. At a later time, such as during runtime of IHS 100, tamper detection F/W 360, executing on BMC 144 periodically retrieves from NV memory device 280, a later generated first hash 294 associated with current first data (e.g. data A 286 and/or F/W image 287) of NV memory device 280. BMC 144 retrieves, from NV memory device 139, a previously stored second hash 342 associated with initial first data (e.g. the initial data A 286 and/or F/W image 287) of NV memory device 280. BMC 144 determines if the first hash 294 and the second hash 342 match. In response to the first hash 294 and the second hash 342 not matching, an error message is generated which indicates that the current first data (e.g. data A 286 and/or F/W image 287) of NV memory device 280 has been tampered with. The error message indicates that data A 286 and/or F/W image 287 has been altered or tampered which could be the result of a computer virus or attack to the boot code and/or firmware of IHS 100. The error message is stored to an error log 370. The non-matching hashes indicate that tampering of the memory contents has been detected. In contrast, matching hashes indicate a likelihood that no tampering has occurred. The data within NV memory devices 220, 250 and 280 allow the OS to communicate with the components and are stored during manufacturing. This data is only modified if the images are being updated. In other words, if this data changes during normal operation, it probably indicates a computer attack.

Figure 4:
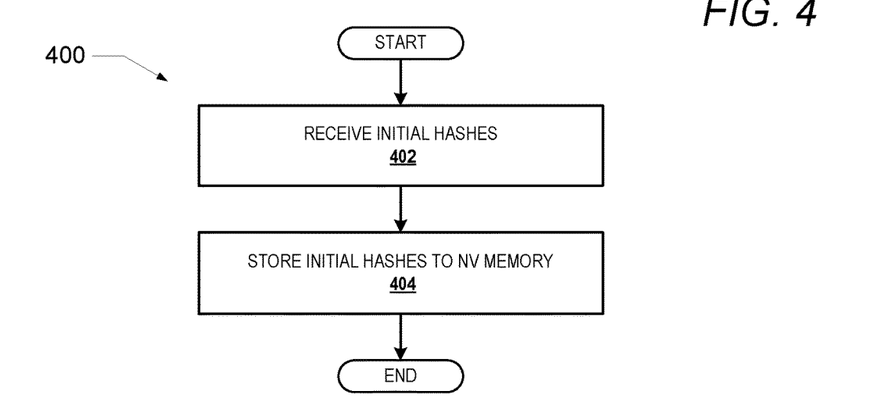
FIG. 4 is a flow chart illustrating one example of a method for receiving and storing initial hashes of memory contents during an initialization process, according to one or more embodiments.
Figure 5:
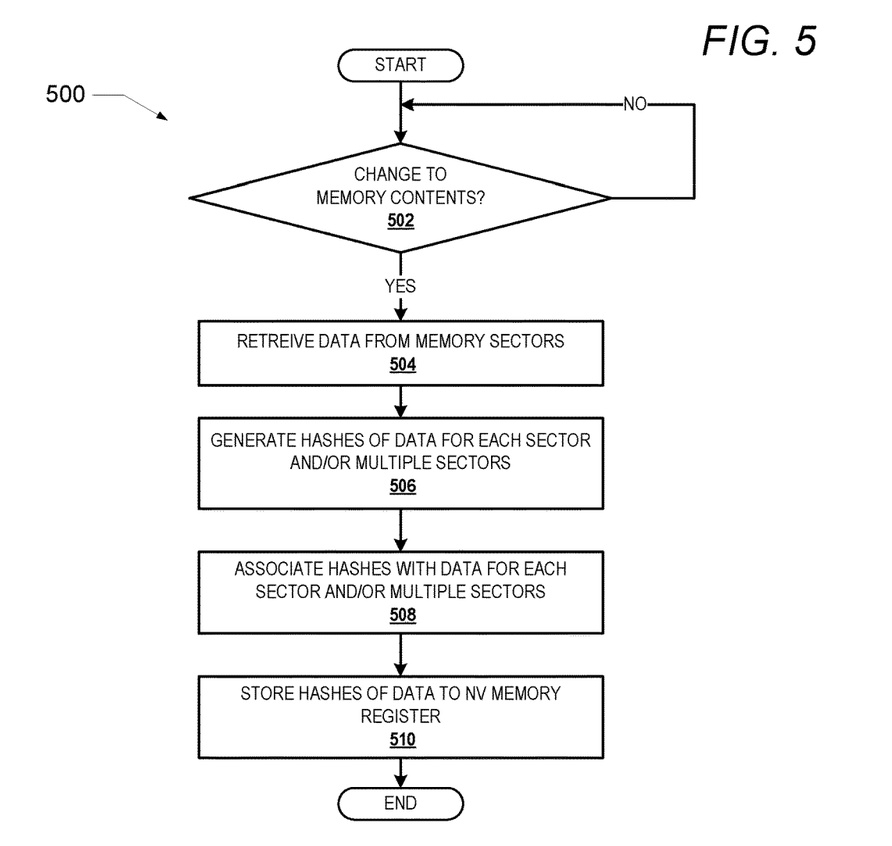
FIG. 5 is a flow chart illustrating one example of a method for generating hashes of memory contents, according to one or more embodiments.
Figure 6:
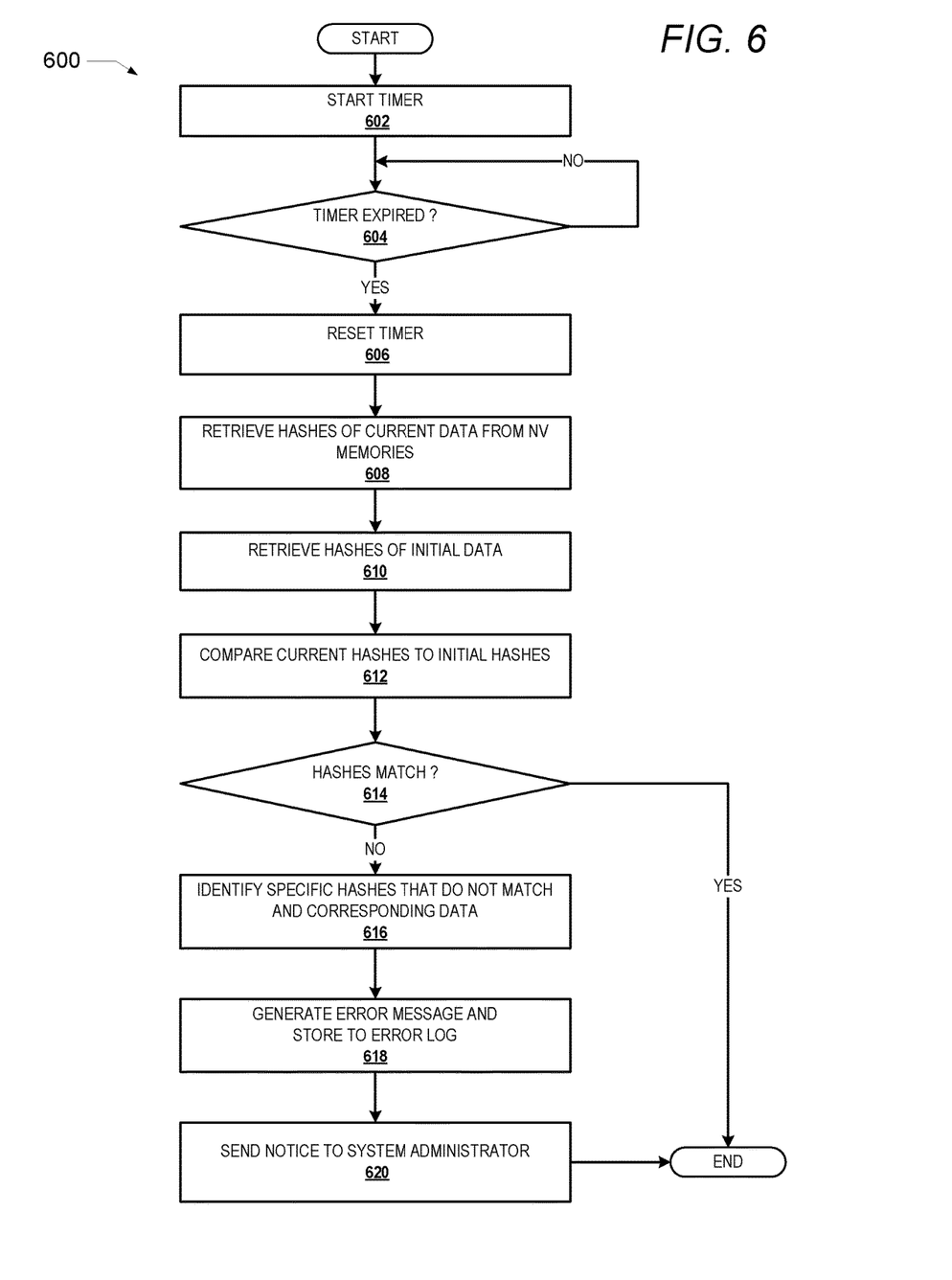
FIG. 6 is a flow chart illustrating one example of a method for detecting tampering of memory contents in an IHS and responding to the detection of tampering, according to one or more embodiments.

FIGS. 4, 5 and 6 illustrate flowcharts of exemplary methods 400, 500 and 600 by which logic 282 and BMC 144 within the preceding figures performs different aspects of the processes that enable the one or more embodiments of the disclosure. Method 400 represents a method for retrieving and storing initial hashes of memory contents during an initialization or provisioning process. Method 500 represents a method for generating hashes of memory contents. Method 600 represents a method for detecting tampering of memory contents in an IHS.

The description of methods 400, 500 and 600 is provided with general reference to the specific components illustrated within the preceding FIGS. 1-3B. Methods 400 and 600 are described as being implemented via BMC 144 and particularly the execution of code provided by tamper detection F/W 360 executing on BMC 144. Method 500 is described as being implemented via logic 282. While method 500 is described as being implemented using logic 282, method 500 can also be implemented via logic 222 and 252 or other logic provided within different configurations of IHS. It is however appreciated that certain aspects of the described methods may be implemented via other processing devices and/or execution of other code.

Method 400 is performed during an initialization or provisioning process of IHS 100 such as during the manufacturing of IHS 100. Referring to the flow chart of FIG. 4, method 400 begins at the start block and proceeds to block 402 where BMC 144 receives the initial hashes (e.g. hashes 234, 236, 264, 266, 294 and 296). BMC 144 can receive the initial hashes from a manufacturing computer or from a system administrator. BMC 144 stores the initial hashes to NV memory 139 as initial hashes 332 (e.g. hashes 334, 336, 338, 340, 342 and 344 (block 404)). Method 400 then ends.

Referring to the flow chart of FIG. 5, method 500 begins at the start block and proceeds to decision block 502 where logic 282 determines if any changes (i.e. writing of data) have been made to the memory contents (e.g. data A 286, data B 290) of NV memory 280. In one embodiment, logic 282 determines if any changes have been made to the memory contents by monitoring if any write operations have been performed to NV memory 280. In response to no changes having been made to the memory contents of NV memory 280, logic 282 continues to monitor for whether any changes have been made to the memory contents, and method loops to decision block 502. In response to changes having been made to the memory contents of NV memory 280, logic 282 retrieves the current data A 286 from sector A 284, and the current data B 290 from sector B 288 (block 504).

Logic 282 generates hash 294 from the current data A 286 and hash 296 from both the current data A 286 and data B 290 (block 506). In one embodiment, a separate hash can be generated for each memory sector. In another embodiment, a hash can be generated for multiple memory sectors. In an additional embodiment, a hash can be generated for all of the memory sectors. Logic 282 associates hash 294 with the current data A 286 and hash 296 with the combination of current data A 286 and data B 290 (block 508). Logic 282 stores hash 294 and hash 296 to register 292 (block 510). Method 500 then ends. In another embodiment, method 500 can detect memory changes and generate and store hashes for other system components of IHS 100 such as PCI device 136 and NID 160. When changes are detected to the memory contents of NV memory 220, logic 222 is triggered to generate and store hashes 234 and 236 to register 232. When changes are detected to the memory contents of NV memory 250, logic 252 is triggered to generate and store hashes 264 and 266 to register 262.

FIG. 6 illustrates a method for detecting tampering of memory contents in an IHS. Method 600 is performed during the operation of IHS 100, which occurs sequentially after initialization and provisioning, i.e., at a later time than the processes presented by method 400. Method 600 repeats on a periodic basis during runtime of IHS 100. Method 600 begins at the start block and proceeds to block 602 where BMC 144 starts timer 372, which has a pre-determined expiration and reset time. Method 600 can repeat over various time periods. In one embodiment, timer 372 can be set such that method 600 repeats every hour. Method BMC 144 determines if timer 372 has expired (decision block 604). In response to timer 372 not being expired, BMC 144 continues to monitor for expiration of the timer (block 604). In response to timer 372 being expired, BMC 144 resets timer 372 (block 606) and BMC 144 retrieves the current hashes from NV memory 220 (e.g. hashes 234 and 236) from NV memory 250 (e.g. hashes 264 and 266) and from NV memory 280 (e.g. hashes 294 and 296) (block 608). In one embodiment, BMC 144 uses sideband bus 186 to retrieve the hashes from NV memories 220, 250 and 280.

BMC 144 retrieves the initial hashes 332 from NV memory 139 (block 610). In one embodiment, NV memory 139 is a secure memory device that protects the initial hashes 332 from external attacks and tampering. At block 612, BMC 144 compares the current hashes to the corresponding initial hashes 332 for each of the system components (e.g. PLD 115, PCI device 136 and NID 160) that have stored memory contents such as data or firmware images that can be affected by tampering. According to the present embodiment, BMC 144 specifically compares the following hashes: hash 234 to hash 334; hash 236 to hash 336; hash 264 to hash 338; hash 266 to hash 340; hash 294 to hash 342 and hash 296 to hash 344. BMC 144 determines if each of the current hashes matches or is the same as the corresponding previously stored initial hash 336 (decision block 614). In response to each of the current hashes matching or being the same as their respective previously stored initial hashes 336, method 600 ends. The current hashes matching the corresponding previously stored initial hashes initial hashes indicates that no tampering of the memory contents has been detected and no additional actions are required.

In response to at least one of the current hashes not matching or being the same as its respective corresponding previously stored initial hash (e.g., one of initial hashes 332), BMC 144 identifies each of the specific current hashes that did not match the corresponding previously stored initial hashes and the corresponding data (block 616). The identification of the corresponding data includes the identification of any F/W images associated with initialization of one or more system components. BMC 144 generates warning or error message and stores the warning/error message to error log 370 (block 618). The error message includes the identity of the specific current hashes that did not match the previously stored initial hashes and the corresponding F/W images or data. The error message indicates that some type of tampering has occurred to the F/W images or data of one or more memory devices.

According to one aspect of the disclosure, BMC 144 sends a notice to a system administrator that tampering has been detected to the memory contents of one or more memory devices (block 620). The system administrator can then determine the appropriate action to take with respect to the operation of IHS 100 after tampering of the memory contents has been detected. Method 600 then ends. In one embodiment, method 600 repeats on a periodic basis during the operation of IHS 100 at a frequency determined by the expiration time of timer 372.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for detecting tampering of memory contents of a system component within an information handling system (IHS), the method comprising:
retrieving, via a board management controller (BMC), from a first memory device of the system component, a first hash associated with current first data within the first memory device;
retrieving, from a secure, second memory device, a previously stored second hash associated with initial first data, the previously stored second hash being a hash received from a register within the first memory device of the system component during a provisioning process of the IHS;
determining if the first hash and the second hash match; and
in response to the first hash and the second hash not matching:
generating an error message which indicates that the current first data of the first memory device within the system component has been tampered with; and
storing the error message to an error log.

2. The method of claim 1, further comprising:
identifying within the current first data, a first firmware image associated with the system component of the IHS; and sending a notice to a system administrator that the current first data is not the corresponding initial first data and that the first firmware image has been altered.

3. The method of claim 1, further comprising receiving a second hash during an initialization process of the IHS and storing the received second hash to the second memory device as the previously stored second hash.

4. The method of claim 1, further comprising:
during operation of the IHS:
periodically starting a timer;
determining if the timer has expired; and
in response to the timer expiring: initiating retrieving of the first hash from the first memory device; and resetting and restarting the timer.

5. The method of claim 1, further comprising:
retrieving, from the first memory device by logic of the first memory device, current first data;
generating, by the logic of the first memory device, the first hash from the current first data;
associating the first hash with the current first data; and
storing the first hash to the register of the first memory device.

6. The method of claim 5, wherein the current first data is retrieved from at least one sector of the first memory device.

7. The method of claim 5, wherein the current first data is retrieved from a plurality of sectors of the first memory device.

8. An information handling system (IHS) comprising:
a first IHS component having a first memory device;
a board management controller (BMC) communicatively coupled to the first IHS component, the first memory device and a second memory device, the BMC having firmware executing thereon for detecting tampering of memory contents, wherein the firmware configures the BMC to:
retrieve from a register of the first memory device, a first hash associated with current first data within the first memory device;
retrieve from a secure, second memory device, a previously stored second hash associated with initial first data of the first memory device, the previously stored second hash being a hash received from a register within the first memory device of the first IHS component during a provisioning process of the IHS;
determine if the first hash and the second hash match; and
in response to the first hash and the second hash not matching:
generate an error message which indicates that the current first data of the first memory device within the first IHS component has been tampered with; and
store the error message to an error log.

9. The information handling system of claim 8, wherein the firmware further configures the BMC to:
identify within the current first data, a first firmware image associated with the IHS system component; and
send a notice to a system administrator that the current first data is not the corresponding initial first data and that the first firmware image has been altered.

10. The information handling system of claim 8, further comprising receiving the second hash during an initialization process of the IHS and storing the received second hash to the second memory device as the previously stored second hash.

11. The information handling system of claim 8, wherein the firmware further configures the BMC to:
during operation of the IHS:
periodically start a timer;
determine if the timer has expired; and
in response to the timer expiring: initiate retrieving of the first hash from the first memory device; and resetting and restarting the timer.

12. The information handling system of claim 8, wherein the firmware further configures the BMC to:
retrieve, by logic of the first memory device, current first data;
generate, by logic of the first memory device, the first hash from the current first data;
associate the first hash with the current first data; and
store the first hash to a register of the first memory device.

13. The information handling system of claim 12, wherein the current first data is retrieved from at least one sector of the first memory device.

14. The information handling system of claim 12, wherein the current first data is retrieved from a plurality of sectors of the first memory device.

15. A detection system for detecting tampering of memory contents in an information handling system (IHS), the detection system comprising:
a first IHS component having a first memory device;
a board management controller (BMC) communicatively coupled to the first IHS component, the first memory device and a second memory device, the BMC having firmware executing thereon for detecting tampering of memory contents, wherein the firmware configures the BMC to:
retrieve from a register of the first memory device, a first hash associated with current first data within the first memory device;
retrieve from a secure, second memory device, a previously stored second hash associated with initial first data of the first memory device, the previously stored second hash being a hash received from a register within the first memory device of the system component during a provisioning process of the IHS;
determine if the first hash and the second hash match; and
in response to the first hash and the second hash not matching:
generate an error message which indicates that the current first data of the first memory device within the first IHS component has been tampered with; and
store the error message to an error log.

16. The detection system of claim 15, wherein the firmware further configures the BMC to:
identify within the current first data, a first firmware image associated with the first IHS component of the IHS; and
send a notice to a system administrator that the current first data is not the corresponding initial first data and that the first firmware image has been altered.

17. The detection system of claim 15, further comprising receiving a second hash during an initialization process of the IHS and storing the received second hash to the second memory device as the previously stored second hash.

18. The detection system of claim 15, wherein the firmware further configures the BMC to:
during operation of the IHS:
periodically start a timer;
determine if the timer has expired; and in response to the timer expiring: initiate retrieving of the first hash from the first memory device; and resetting and restarting the timer.

19. The detection system of claim 15, wherein the firmware further configures the BMC to:

retrieve, by logic of the first memory device, from the first memory device, current first data;

generate, by logic of the first memory device, the first hash from the current first data;

associate the first hash with the current first data; and store the first hash to a register of the first memory device.

20. The detection system of claim 19, wherein the current first data is retrieved from at least one sector of the first memory device.

\* \* \* \* \*